United States Patent
Garel-Jones et al.

[11] Patent Number: 5,594,820
[45] Date of Patent: Jan. 14, 1997

[54] OPTO-MECHANICAL DEVICE HAVING OPTICAL ELEMENT MOVABLE BY TWIN FLEXURES

[75] Inventors: Philip M. Garel-Jones, Nepean; Murray R. Harman; Timothy P. Cutts, both of Ottawa, all of Canada

[73] Assignee: JDS Fitel Inc., Nepean, Canada

[21] Appl. No.: 385,477

[22] Filed: Feb. 8, 1995

[51] Int. Cl.$^6$ .............................. G02B 6/26; G02B 6/42
[52] U.S. Cl. ................................. 385/22; 385/18; 385/19
[58] Field of Search ........................ 385/16, 18, 19, 385/20, 21, 22

[56] References Cited

U.S. PATENT DOCUMENTS

| | | | |
|---|---|---|---|
| 5,004,318 | 4/1991 | Ohashi | 385/19 |
| 5,268,974 | 12/1993 | Hikita et al. | 385/19 |

*Primary Examiner*—Rodney B. Bovernick
*Assistant Examiner*—Robert E. Wise

*Attorney, Agent, or Firm*—Thomas Adams

[57] ABSTRACT

An opto-mechanical switch suitable for use in optical telecommunications systems comprises an input port and two output ports interconnected by an optical path, an optical element and an actuation mechanism for moving the optical element relative to the optical path so as to change coupling of light beams between the input port and the output ports. The optical element is supported by a flexible suspension unit comprising a pair of mutually-spaced twin elongate flexures. Each of the pair of flexures is attached at one end to an anchorage and at its other end to a mounting for optical element. The flexures are identical in length and flexibility and are spaced apart in the direction of displacement of the optical element. In use, when the actuator displaces the optical element, the flexures flex in common in the direction of displacement of the optical element. The optical element may be an optical fiber, a mirror, a prism, and so on. The twin flexures obviate the need for precision sliding surfaces which assures greater dependability, especially in switches which are used very infrequently, such as routing switches for re-routing traffic around a failed local station in a ring architecture system.

15 Claims, 8 Drawing Sheets

OPTO-MECHANICAL DEVICE HAVING OPTICAL ELEMENT MOVABLE BY TWIN FLEXURES

BACKGROUND OF THE INVENTION

1. Technical Field

The invention relates to optical devices and in particular to so-called opto-mechanical devices, in which the switching of, or other operation upon, optical signals is achieved by displacing an optical element, such as an optical waveguide, a mirror, a prism, and so on. Embodiments of the invention are especially applicable to optical telecommunications systems.

2. Background Art

Within optical telecommunications systems, the applications for optical switches are generally analogous to those for electrical switches in conventional telecommunications systems. Thus, the system might use optical switches of several different kinds with various performance characteristics according to the particular application. For example, the switches might range from simple 1×2 port switches to complex multi-port switches and switching speeds might vary over a wide range. Although many alternative switching technologies have been demonstrated, so-called "opto-mechanical" switches are preferred for most, if not all, practical applications. In such opto-mechanical switches, the switching function is achieved by physically displacing an optical element, which might be a mirror, prism or even an optical fiber carrying the signal. For example, a known 1×2 switch operated electromagnetically comprises a tube with a pair of permanent magnets on either side of the middle of the tube. A cylindrical solenoid coil is provided inside the tube. Two fibers protrude into the tube from one end and are located in opposed V-grooves in respective half-cylindrical ferrules. A single, movable optical fiber protrudes into the tube from the other end to such an extent that its end protrudes into the opposed V-grooves. A magnetic alloy sleeve is attached to the middle of the movable fiber. Operation of the electromagnet displaces the magnetic alloy sleeve towards one or other of the permanent magnets, causing the end of the movable fiber to align with one or other of the stationary fiber ends. A disadvantage of such a switch is that curvature of the flexed fiber may lead to problems in aligning the end of the movable fiber with the fixed fibers. Greater precision might be achieved by replacing the magnetic sleeve with a sliding mounting, but the problem of moving the mounting precisely then arises.

For more complex switching functions, it is known to make a 4×4 matrix switch from six 2×2 movable optical elements disposed in an optical path between an input lens array and an output lens array, each array comprising four rod lenses coupled to a corresponding number of optical fibers. The rod lenses collimate and focus light beams passing between the input and output fibers. Each movable optical element consists of a rhombic glass block which can be slid to and fro transversely relative to the arrays by means of electromagnets. In one position, the "straight-through" position, the glass block causes two adjacent light beams to pass through it in parallel. In the other position, the "crossover" position, the glass block causes the two beams to cross over. Hence, sliding the glass blocks to and fro changes the coupling between the input and output fibers.

In many situations, such opto-mechanical switches will perform satisfactorily for long periods since, unlike electromechanical switches, they do not have electrical contacts susceptible to contact resistance problems. However, in other situations, they may be unsatisfactory. Usually, the input and output ports of the switch will be single mode optical fibers with core diameters of about 8 micrometers, so the displacement of the movable element must be extremely precise and extremely stable mechanically. Where pivoting or sliding mechanisms are used to move the optical element, mechanical stability may be achieved by using relatively large moving parts. Unfortunately, this requires the actuator, i.e. solenoid, relay armature, and so on, to be relatively large. Such increased size may lead to difficulties and increased costs, both during manufacture and when the switch is installed.

Them are some applications where known optical switches are unsatisfactory for other reasons. For example, in a telecommunications system which employs a ring system architecture, if a local station fails, the main traffic can be re-routed by a routing switch which operates and by-passes the failed station. The routing switch may never need to operate throughout the lifetime of the system. If and when it does, however, it must be totally dependable, especially if it is installed in a submarine system. Where sliding or pivoting parts are used to move the optical element, they may be affected by corrosion, rusting, oxidation, and so on, causing binding of the drive mechanism, especially in such submarine applications or other adverse environmental situations.

Where a switch is subject to repeated operation, its reliability and dependability over its expected lifetime can be assessed by accelerated usage to simulate such repeated operation. However, this approach is unsuitable for ensuring that a switch will operate after such a long period of inactivity. It is desirable, therefore, for the switch design to be inherently dependable.

Thus an object of the present invention is to mitigate the problems of known opto-mechanical switches and to provide an improved opto-mechanical switch which is dependable where operation is infrequent.

SUMMARY OF THE INVENTION

According to the present invention, an opto-mechanical device comprises first port means and second port means interconnected by an optical path, an optical element, and actuator means for moving the optical element relative to the optical path so as to change coupling of light beams between the first port means and the second port means, the optical element being displaceably supported by a flexible suspension means comprising a pair of mutually-spaced twin elongate flexures, each of the flexures being attached at one end to an anchorage and at its other end to a mounting for the optical element, the flexures being spaced apart in the direction of displacement of the mounting, the arrangement being such that the flexures flex together as the mounting is displaced.

The flexures may be resilient and return to their original condition i.e. before flexing, upon de-activation of the actuator means.

The mounting and the anchorage may each comprise a block with parallel opposite surfaces. The flexures may then be attached, at one end, at respective spaced points of the anchorage, and at the other end, at respective spaced points of the mounting. Conveniently, the spaced points are at the surfaces.

Each flexure may comprise a medial portion that is substantially thicker than, and extends between, flexible web portions adjacent opposite ends of the flexure.

The actuator mechanism may comprise a solenoid having an operating coil and a displaceable armature, the armature acting against the mounting to displace the optical element. Preferably, the displacement axis of the armature is substantially aligned with the middle of the mounting.

Alternatively, the actuator means may comprise one or more electromagnets cooperating with a magnetic part of, or attached to, the mounting.

In one preferred embodiment of the invention, the longitudinal axes of the flexures extend parallel to the optical path. The switch comprises a switch body having two spaced support supporting input and output port means. One of the supports is narrower than the switch body and the suspension unit extends alongside this narrower support. The optical element projects transversely to the longitudinal axis of the suspension unit and into a space between the two supports. The actuator means comprises an electromagnet having two elongate armature members extending parallel to the suspension unit. The armature members have pole pieces which extend perpendicularly from the respective ends of the armature members to a position adjacent the mounting. Permanent magnets are provided on the mounting or the flexures and are attracted towards, or repelled from, the pole pieces when the electromagnet is energized.

In a modification of this preferred embodiment, the electromagnet comprises operating coils wound directly upon the respective pole pieces. The core of the electromagnet is positioned medial of the body of the switch and has transversely-extending extension pieces supporting the pole pieces.

Various objects, features, aspects and advantages of the present invention will become more apparent from the following detailed description, taken in conjunction with the accompanying drawings, of preferred embodiments of the invention, which are described by way of example only.

DESCRIPTION OF THE PREFERRED EMBODIMENTS

Figure 2:
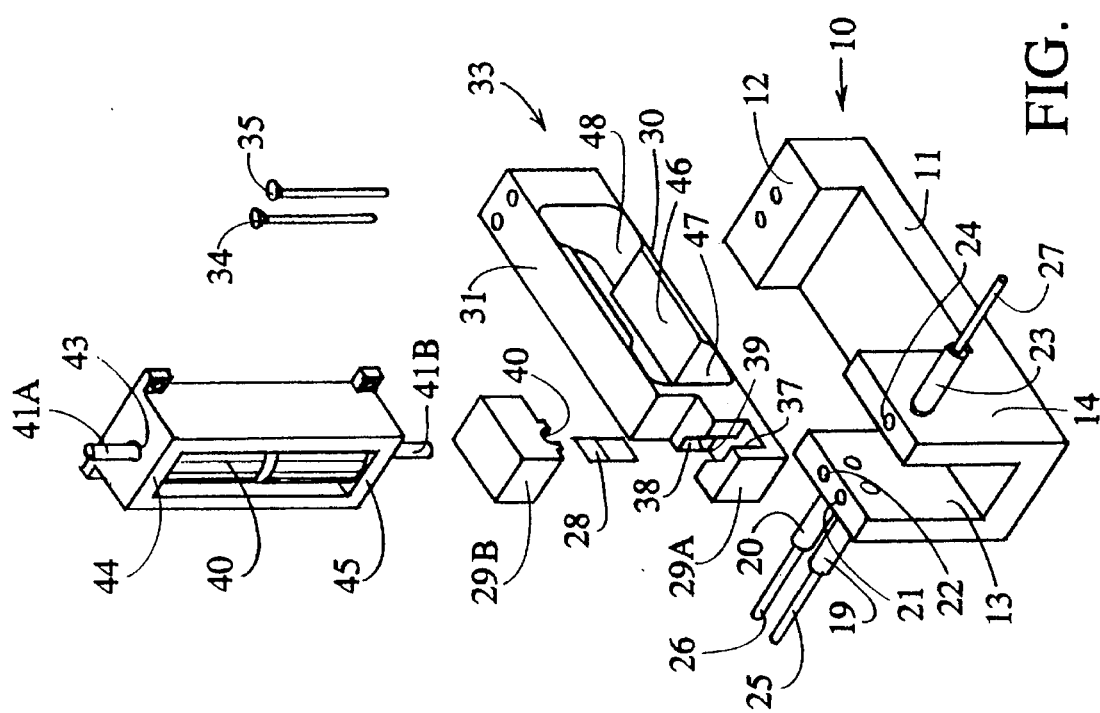
FIG. 2 is an exploded view of the optical switch assembly of FIG. 1.
Figure 1:
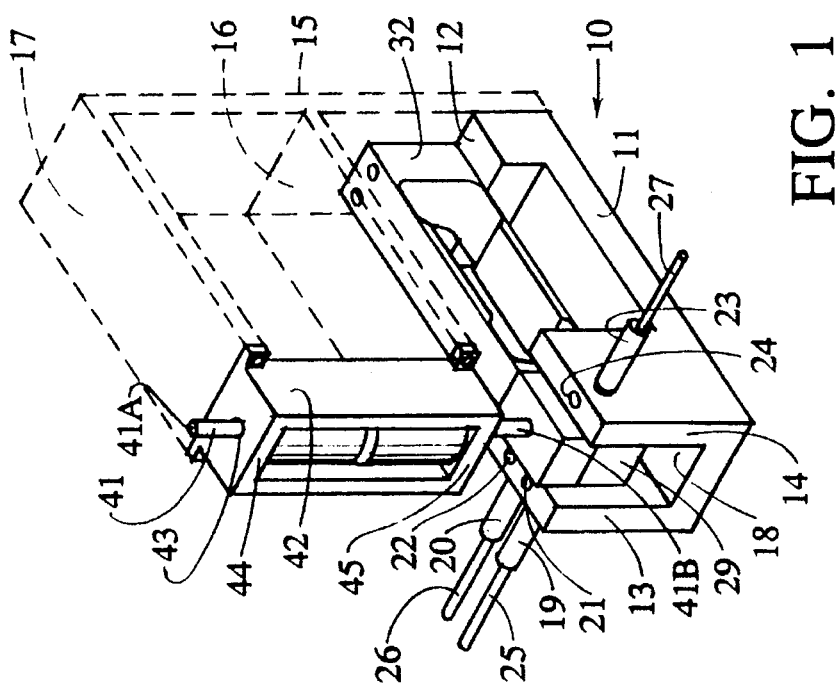
FIG. 1 is a perspective view of a first embodiment of the invention, comprising a 1×2 optical switch assembly in which an optical element is movable to provide the switching function.

Referring first to FIGS. 1 and 2, a 1×2 port optical switch assembly comprises an elongate base member 10, formed from an aluminum block, having a middle section 11, an elevated pedestal portion 12 forming a support at one end and, at the other end, a pair of side support arms 13 and 14 on opposite sides. Each of the side support arms 13 and 14 extends along a part only of the length of the base member and projects upwards. A support plate 15 extends upwards from the other end of the base member 10. Two spaced cantilever support arms 16 and 17 project away from the plate 15 to a position adjacent the arms 13 and 14. The plate 15 and the cantilever support arms 16 and 17 each comprise a flat aluminum plate. They are shown in broken lines to simplify the drawing. They could, in fact, be part of, or replaced by, parts of a housing for the device.

The portion 18 of the base member between the side support arms 13 and 14 forms with the arms a generally U-shaped channel. The two output ports of the switch comprise a pair of GRIN rod lenses 19 and 20 which extend parallel to each other through the side arm 13 and are secured by set screws 21 and 22, respectively, in corresponding screwthreaded holes extending into the arm 13 from its end face. The input port comprises a third rod lens 23 extending through the opposite arm 14 and secured in a similar fashion by a set screw 24. Input rod lens 23 is aligned with output rod lens 19. The other, unaligned, output rod lens 20 is nearer to the plate 15. The rod lenses 21, 22 and 23 are attached to optical fiber tails 25, 26 and 27, respectively, for connecting the switch in circuit with optical fibers of a fiberoptic transmission system. The input rod lens 23 will expand a light beam from input optical fiber 27 so that it is collimated when it emerges from the inner end of the lens. Conversely, each of the output rod lens 19 and 20 will focus a light beam received at its inner end and couple it into the corresponding one of output optical fibers 25 and 26. (It will be appreciated that the paths of the light beams could be reversed, the designation "input" and "output" being for convenience.)

Figure 3:
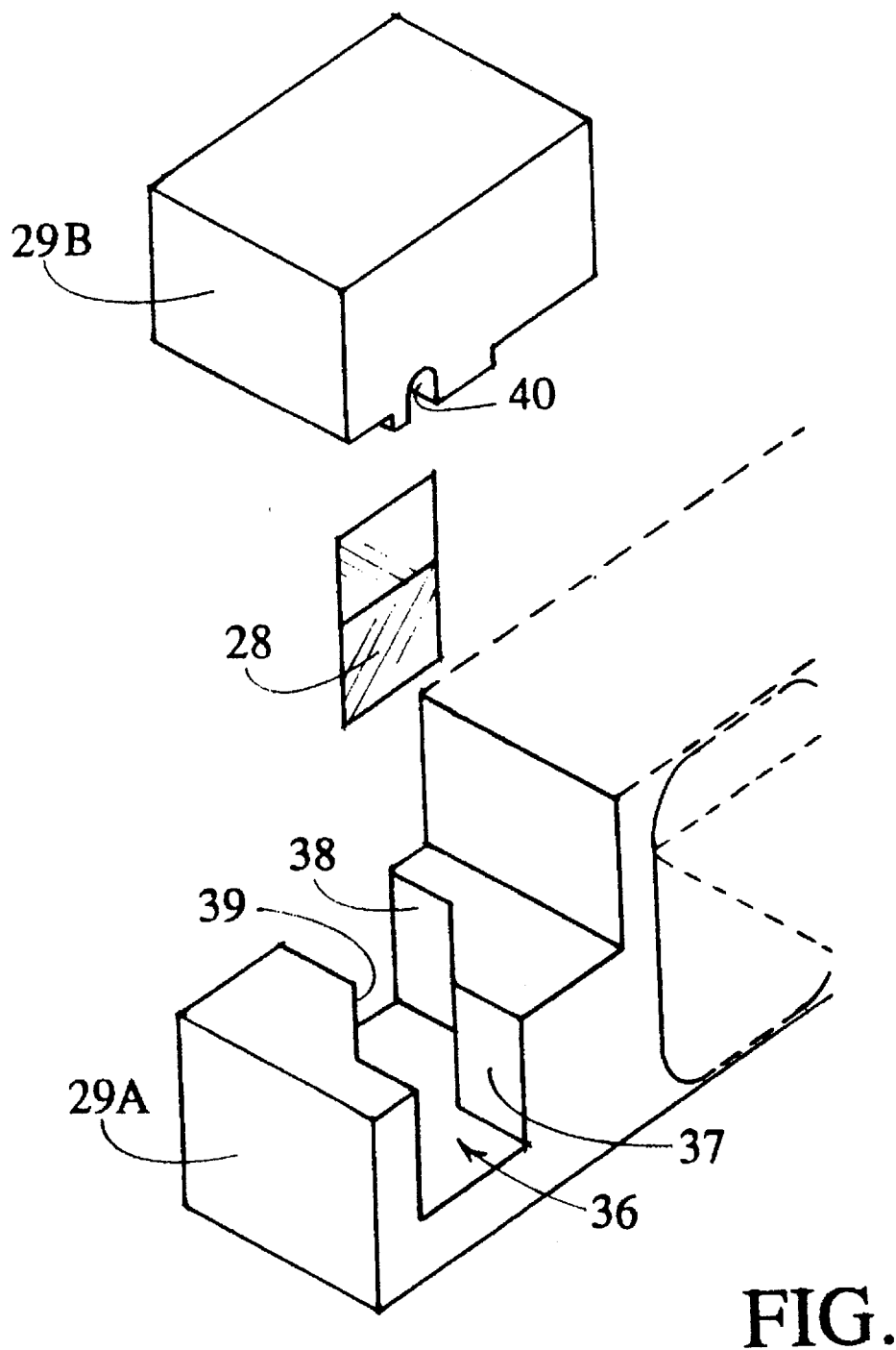
FIG. 3 is an exploded detail view of the optical element and its mounting.

A prism 28 (not shown in FIG. 1) is carried by a prism mounting 29 which is suspended between the spaced arms 13 and 14. Twin, parallel flexure elements 30 and 31 extend between, and are integral with, the prism mounting 28 at one end and an anchorage block 32 at the opposite end, forming an integral suspension unit 33. The anchorage block 32 is secured to the upper face of pedestal 12 by screws 34 and 35. The prism mounting 29 comprises two parts, vis. an aluminum block 29A and a cover plate 29B. As shown in more detail in FIG. 3, a jogged channel 36 extends along the surface of the block 29A in the direction of the optical path between the input and output ports. A first parallel-sided end section 37 of channel 36 extends parallel to the optical axis of input rod lens 23. The opposite end section 38 also is parallel-sided and extends parallel to the optical axes of rod lenses 19 and 20, but offset or jogged relative to the first section 37. A central, parallel-sided section 39 of the channel 34 extends obliquely to join the two end sections and houses the prism 28 which is rhombic in shape. A straight-through orifice is defined by a groove 40 (FIG. 3) in the juxtaposed surface of the cover plate 29B.

The height of the pedestal 12 is such that, when the flexures 30 and 31 are not flexed, they extend generally parallel to the base member and with the lower face of prism mounting block 29A spaced from the bottom or bight portion 18 of the U-shaped channel. This spacing allows the prism mounting 29 to be displaced downwards.

The prism mounting 29 can be displaced downwards by means of an actuator mechanism, specifically a solenoid comprising a cylindrical coil assembly 40 and concentric armature 41. The solenoid coil 40 is supported in a rectangular box-like housing 42 attached to the free ends of the cantilever support arms 16 and 17 so that the cylindrical axis of the armature 41 is centered on the middle of the prism mounting 29. Opposite end portions 41A and 41B of the armature 41 extend through corresponding clearance holes 43 (only one is shown) in the end walls 44 and 45, respectively, of the housing 42. The lower end portion 41B of the armature 41 abuts the surface of cover plate 29B. With the solenoid coil 40 de-energized, the flexures 30 and 31 are not flexed. When the solenoid coil 40 is energized, the armature 41 displaces the prism mounting 29 away from the coil 40 and the prism 28 out of the optical path.

When the flexures 30 and 31 are not flexed, the prism 28 is interposed between the input rod lens 23 and the output rod lenses 19 and 20. A light beam leaving the input rod lens 23 is diffracted to couple to the unaligned output rod lens 20. When the prism 28 is displaced downwards and out of the optical path between the rod lenses, a light beam from input rod lens 23 will pass straight through the groove 40 to couple to the aligned output rod lens 19.

It should be noted that the clearance between the moving parts, i.e. between the prism mounting 29 and the side arms 13 and 14, and between the armature 41 and the coil 40 and walls of holes 43, is sufficient to ensure that binding will not occur. The width of the flexures 30 and 31 is sufficient to ensure that the prism mounting 29 will not twist but will be displaced precisely. Being attached in common at both ends, the flexures flex together by corresponding amounts.

Figure 4A:
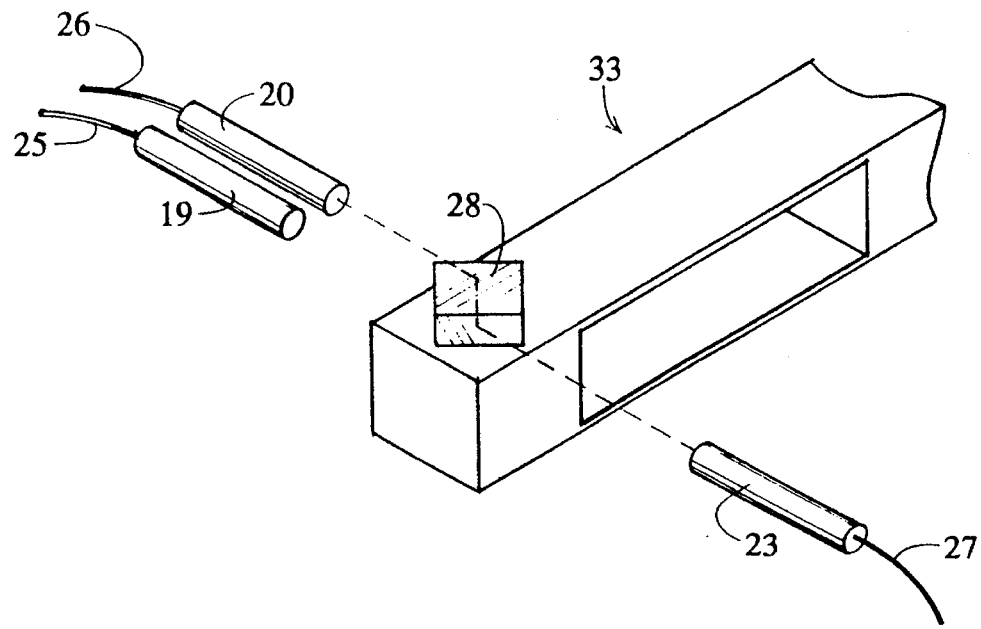
FIGS. 4A and 4B are detail schematic views of the optical element in different operating positions.
Figure 4B:
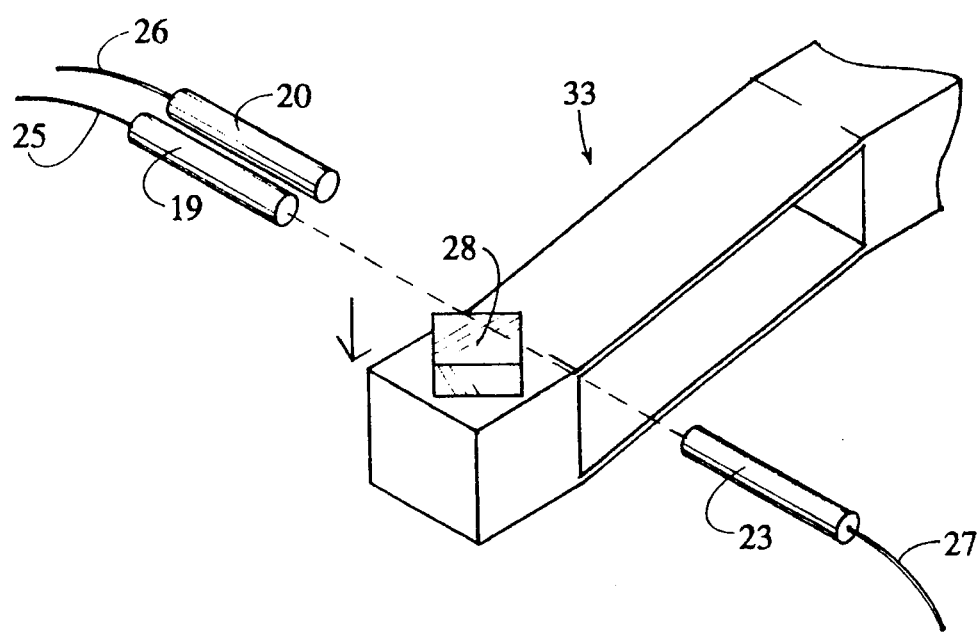

It should be appreciated that long term reliability basically depends upon the flexibility of the suspension unit 33. As shown in the drawings, the interior faces of the flexures 30 and 31 are stepped adjacent each end so that each flexure has a middle portion 46 which is thicker than the end portions 47 and 48, which are relatively thin, flexible webs providing a high degree of flexibility with stability. This configuration also ensures that, as shown in FIGS. 4A and 4B, the prism 28 and its mounting 29 will tend to move in a path which is substantially linear and generally perpendicular to the optical axes of the rod lenses. Although there may be slight changes in the relative inclination of the prism and the rod lenses, the use of relatively long flexures will help to minimize it.

Figure 6:
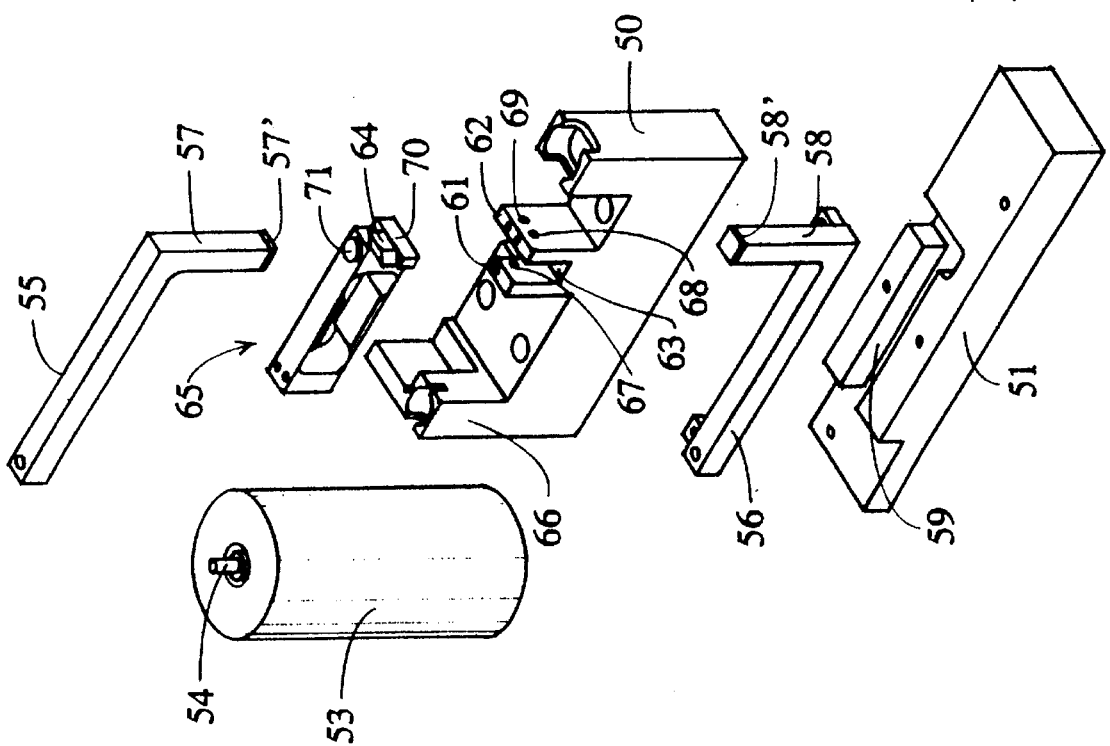
FIG. 6 is an exploded view of the optical switch assembly of FIG. 5.
Figure 5:
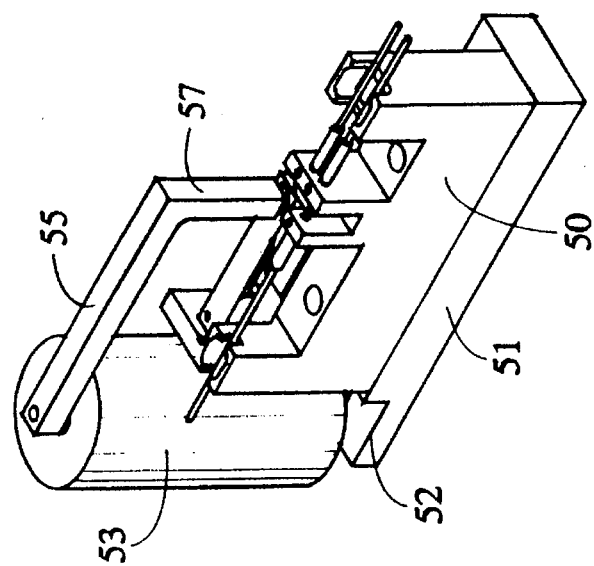
FIG. 5 is a perspective view of a second embodiment of the invention, comprising a 1×2 optical switch in which there are no sliding parts.
Figure 7:
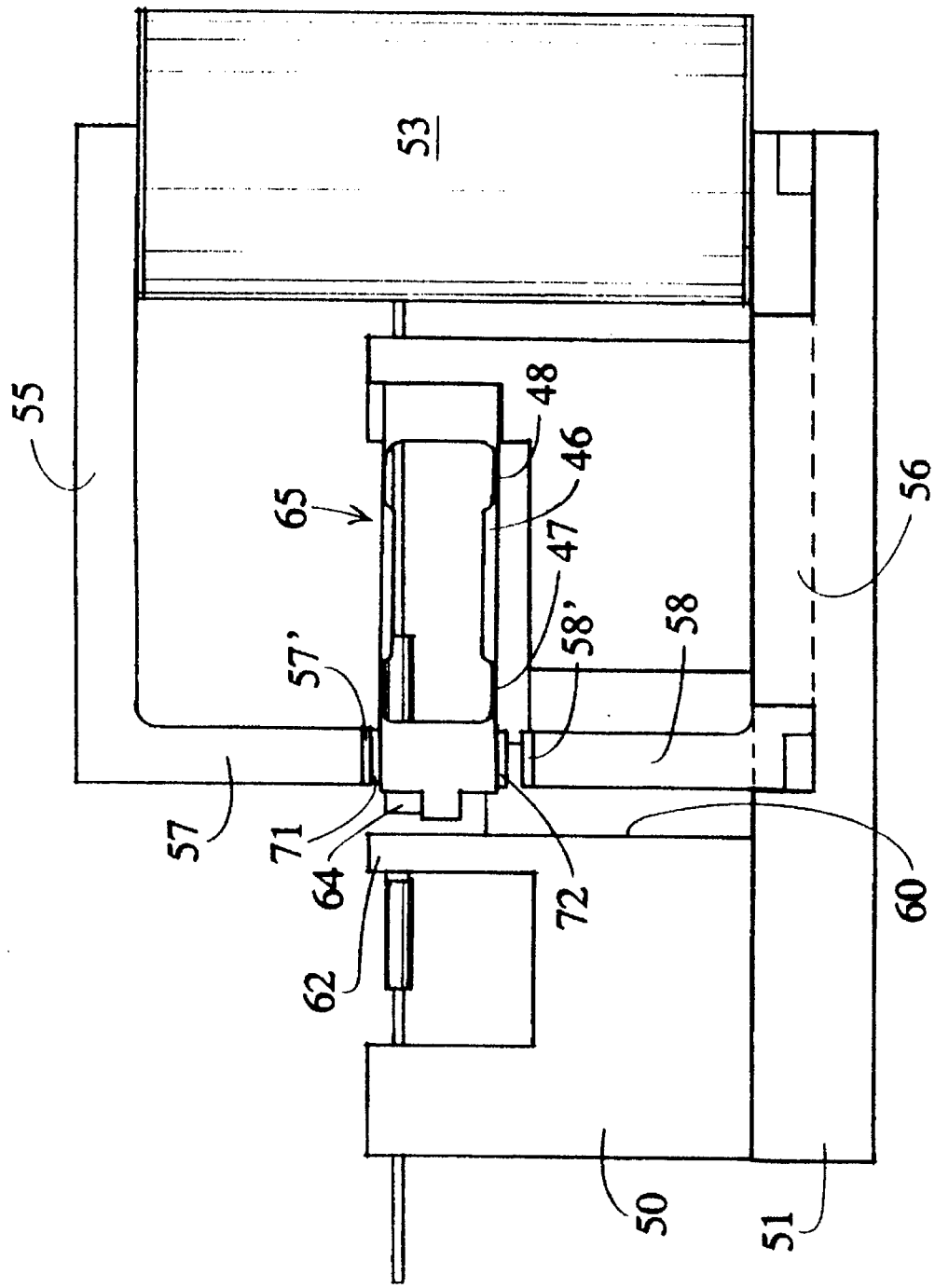
FIG. 7 is a rear view of the switch of FIG. 5.

Although the optical switch shown in FIGS. 1 and 2 avoids the use of sliding surfaces between the parts which must be precisely aligned, i.e. the optical element/prism 28, its mounting 29 and the rod lenses, it does use sliding parts in the actuator mechanism. Such a switch will work satisfactorily after long periods of non-use because the electromagnet is not a precision component and hence adequate clearance can be provided. In particular, them is ample clearance between the sides of the prism mounting 29 and the inner faces of arms 13 and 14 so that the prism mounting 29 can move freely. Nevertheless, it may be desirable to avoid sliding parts in the actuator mechanism also. FIGS. 5, 6 and 7 illustrate an optical switch in which the actuator mechanism also has no sliding parts. The switch of FIGS. 5, 6 and 7 has a suspension unit similar to that shown in FIGS. 1 and 2 but the longitudinal axis of the flexures is parallel to the optical axes of the rod lenses, leading to a flatter, more compact switch. The switch comprises an elongate switch body 50 mounted on a base member 51. The switch body 50 is shorter than the base member 51 so that an end portion 52 of the base member extends beyond one end of the switch body 50. An electromagnet coil 53 of silicon steel, nickel-iron or other suitable material is mounted upon the protruding end portion so that the cylindrical axis of the coil 53 is perpendicular to the base member 51. An armature core 54 extends through the cylindrical coil 53 and has two L-shaped armature extension pieces 55 and 56 attached to its respective ends. The two L-shaped armature extensions 55 and 56 project towards the middle of the switch body 50. Pole pieces 57 and 58 are attached to the ends of the armature extensions 55 and 56, respectively, and project towards each other. Armature section 56 lies in a longitudinal groove 59 (FIG. 6) in the base member 51 and its pole piece 58 extends away from the base member 51 and through a recess 60 (FIG. 7) which extends upwards through the body 50 to communicate with the upper surface of the switch body 50. Two pillars 61 and 62 project upwards one each side of a recess 60. The pillars define a recess 63 to receive the prism 64 which is attached to one end of a cantilever suspension unit 65 which comprises twin flexures similar to those shown in FIGS. 1 and 2. The other end of the cantilever suspension unit 65 is attached to an upstanding pedestal portion 66 of the switch body 50, at the end adjacent the electromagnet coil 53. An input rod lens 67 extends through pillar 61 in alignment with an output rod lens 68 which extends through the other pillar 62. A second, unaligned, rod lens 69 extends through pillar 62 with its optical axis parallel to that of the rod lens 68. The respective widths of the pillar 61 and the end of the suspension unit 65 are about one half the width of the switch body 50. The suspension unit 65 projects to a position alongside the pillar 61. The prism mounting differs from that of the previously-described embodiment in that the prism mounting 70 projects laterally of the suspension unit 65 into the recess 63 so that the prism 64 protrudes across the recess 63.

When the suspension unit 65 is not flexed, the prism 64 lies near the mouth of the recess 63 and in the optical path between the rod lenses 67, 68 and 69. When the suspension unit 65 is flexed, the prism 64 is displaced towards the bottom of the recess 63 and out of the optical path.

A pair of permanent magnets 71 and 72, conveniently made of samarium cobalt, are attached to respective opposite faces of the end portion of the suspension unit 65 so as to be opposed to the ends of pole pieces 57 and 58, respectively. When the electromagnet 53 is energized, the magnets 71 and 72 are repelled by, or attracted towards their respective pole pieces 57 and 58, displacing the end of the suspension unit 65 towards the bottom of the recess 63 and the prism 64 out of the optical path.

The end faces of pole pieces 57 and 58 carry shims 57' and 58', respectively, of brass, aluminium or other non-magnetic material. The shims 57' and 58' maintain a clearance between the pole pieces 57 and 58 and their corresponding magnets 71 and 72, respectively, so to as to prevent the magnet clamping directly to the pole piece and reduce the force to be overcome when switching from one position to another.

An advantage of the switch shown in FIGS. 5, 6 and 7, with the flexures extending generally parallel to the optical axes of the input and output ports, is that the switch is relatively slim. Also, the use of pole pieces on opposite sides of the prism mounting, and associated permanent magnets, in combination with the spaced webs 45/46, will tend to maintain the orientation of the prism mounting and linearity of displacement.

Figure 9:
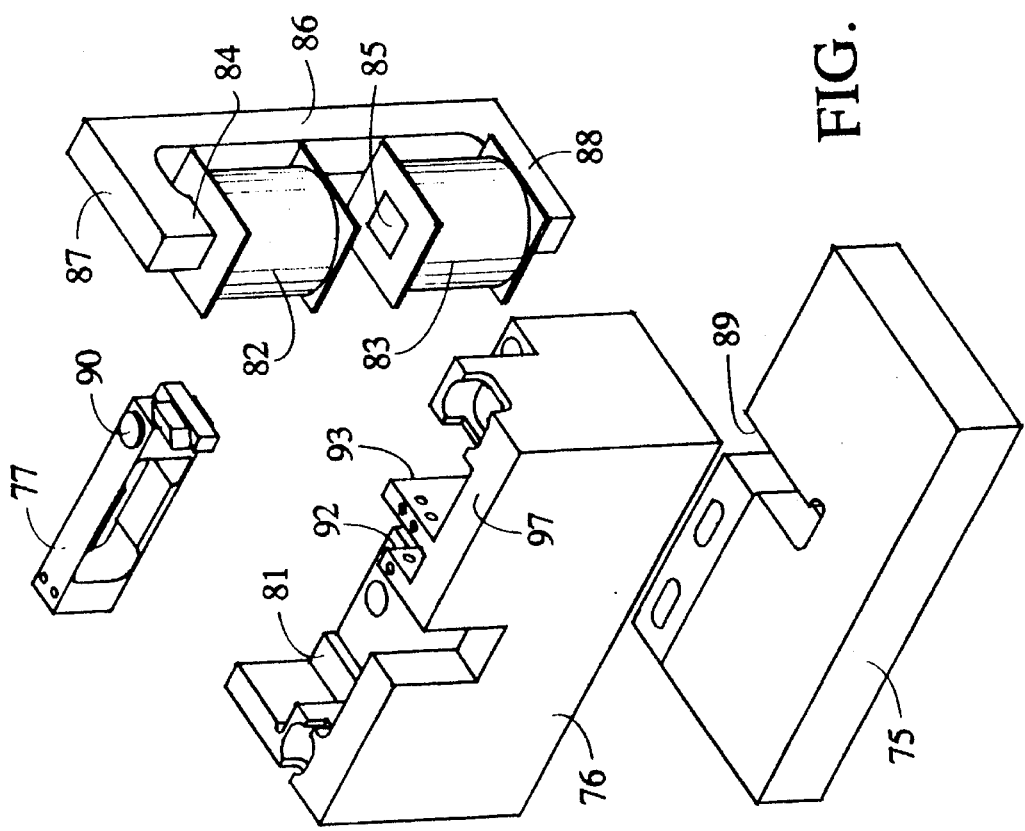
FIG. 9 is an exploded view of the switch assembly of FIG. 8.
Figure 8:
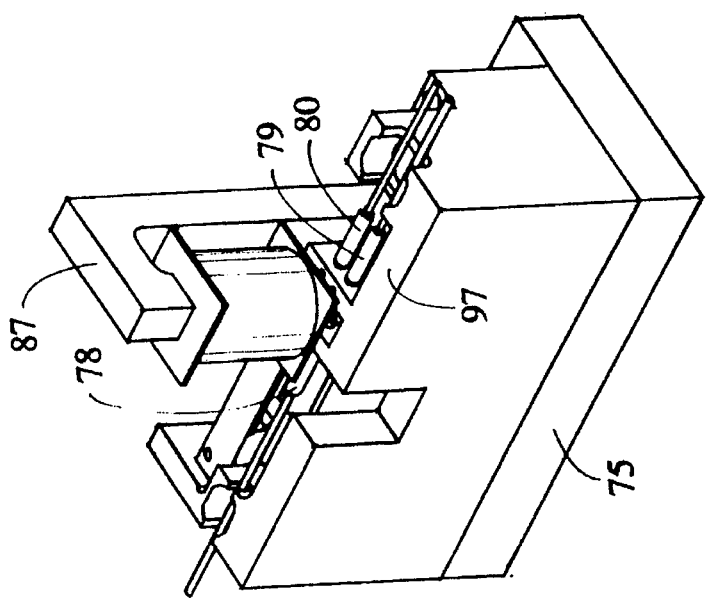
FIG. 8 is a perspective view of a third embodiment of the invention comprising a 1×2 optical switch assembly actuated by means of a pair of electromagnet coils.

A third embodiment of the invention, illustrated in FIGS. 8 and 9, is generally similar to that of FIGS. 5, 6 and 7 in that it has an elongate base member 75 and body 76 with a suspension unit 77 extending parallel to the optical axes of input rod lens 78 and output rod lenses 79 and 80. The suspension unit 77 is secured at one end to a pedestal 81 adjacent one end of the body 75. The main difference is that the actuator mechanism is alongside the body 76, rather than at the end, and comprises two electromagnet coils 82 and 83 mounted upon pole pieces 84 and 85, respectively. The pole pieces 84 and 85 are parts of a unitary C-shaped armature having a central limb 86 and lateral extensions 87 and 88 projecting from its ends. The pole pieces 84 and 85 are integral with, and project inwards from, the extensions 87 and 88, respectively. Extension member 88 is accommodated in a transverse slot 89 extending into the base member 75 from one side. Electromagnet coil 83 is accommodated in a recess in the body member 76 so that the ends of the pole pieces 84 and 85 are above and below, respectively, the permanent magnets 90 of the suspension unit 77. The ends of pole pieces 84 and 85 carry non-magnetic shims (not shown) as in the previous embodiment. The support walls 92 and 93, supporting input rod lens 78 and output rod lenses 79 and 80, project in cantilever fashion from a sidewall extension 97 of body 76.

The configuration of the suspension unit 77 and the side support arms 92 and 93 is otherwise similar to that of FIGS. 5, 6 and 7 and so will not be described again. The materials will also be the same.

It will be appreciated that the diameters of the two electromagnet coils 82 and 83 may be much less than that of the single coil 53 of the switch of FIGS. 5, 6 and 7, allowing the width of the switch to be reduced even further.

Figure 10A:
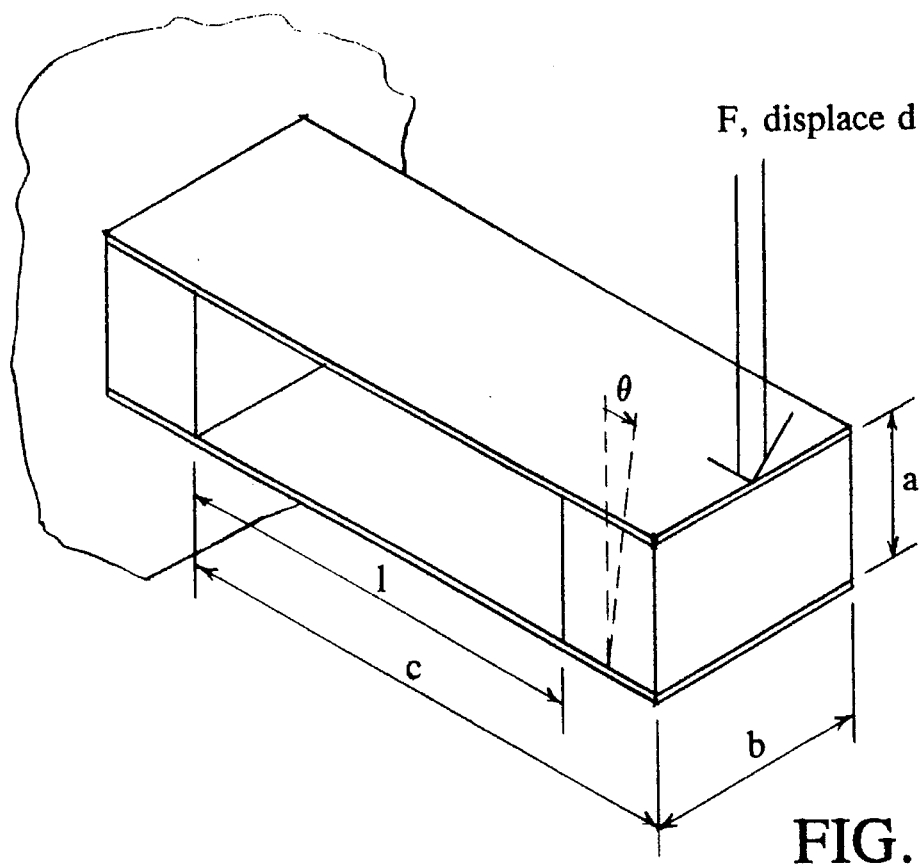
FIGS. 10A and 10B identify relevant parameters of the optical element supporting flexure.
Figure 10B:
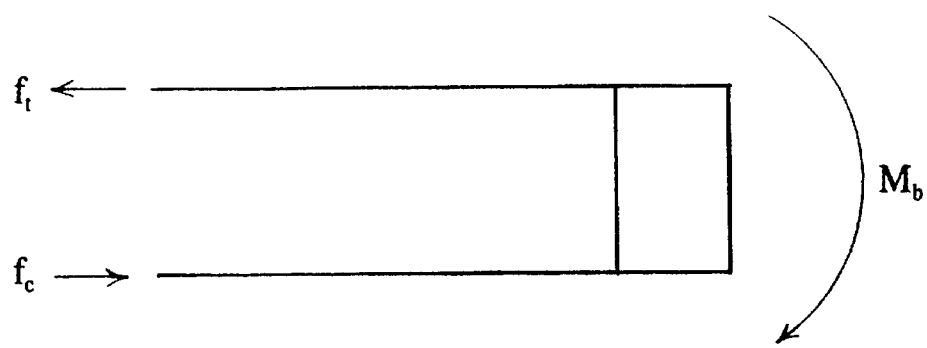

The following engineering calculations demonstrate basic characteristics of a suspension which comprises dual cantilever flexures, the parameters of the flexures being shown in FIG. 10. Each of the two flexures of the twin-flexure suspension shown in FIG. 10 comprises a sheet of stainless steel with thickness (h) of 51 μm. The dimensions of the flexures are as follows: unsupported length l (i.e. between the anchorage and the prism mounting)=14 mm; spacing between flexures a=6.3 mm.; width of each flexure b=12.8 mm.; distance c from the anchorage to the distal end of the flexures=17 mm.

With the moment of inertia I for the cross sectional area of the metal sheet determined as I=b·h$^3$/12, and Young's modulus E=190×10$^9$ N/m$^2$, the stiffness (K) of the twin-flexure suspension illustrated in FIG. 10 can be calculated as follows:

$$K=24 \cdot E \cdot I/l^3$$

The force (F) which is required to displace the free end of the flexure by a distance d mm. can be calculated by the following equation, $$F=K \cdot d$$

This is an approximation. Using these parameters, the force required for a displacement d of 1 mm was calculated as 24 g-f, whereas the measured value was 21 g-f.

It will be seen from the above that a relatively small force is sufficient to actuate an optical device embodying the invention, so the actuator mechanism also can be relatively small. This leads to a compact design as previously mentioned.

Although the movement of the optical element is substantially linear, there will be some non-linearity due to the fact that the flexing movement is based on distortion of metal. The following calculation predicts the non-linearity of the movement or the rotation of the end piece or prism mounting. When a force F is applied at the free end, and the flexure is displaced by d, the reaction (M) at the fixed end of the flexure is $$M=F \cdot c=f_t \cdot a$$

FIG. 10 shows the directions of the tensional and compressional forces $f_t$ and $f_c$, respectively, in the flexures. Due to these forces, the cantilever suspension unit elongates or contracts by an amount:

$$\Delta l=f_t \cdot l/b \cdot h \cdot E$$

Consequently, the end piece of the flexure rotates by an angle of θ radians as illustrated in FIG. 10. The value of θ can be calculated by the following equation, $$\theta=2 \cdot \Delta l/a$$

Using the same parameters which were used for the previous calculation, θ can be estimated as 0.072 milliradians for d=1 mm. In practice, the non-linearity of the movement is not a primary concern when designing a device in which the respective end positions of the optical element can, and need, be determined. However, the calculation demonstrates that the movement of the dual flexure is well controlled and repeatable in spite of the simple mechanical structure. Hence, the positioning of the prism can be controlled precisely and repeatedly.

Figure 11A:
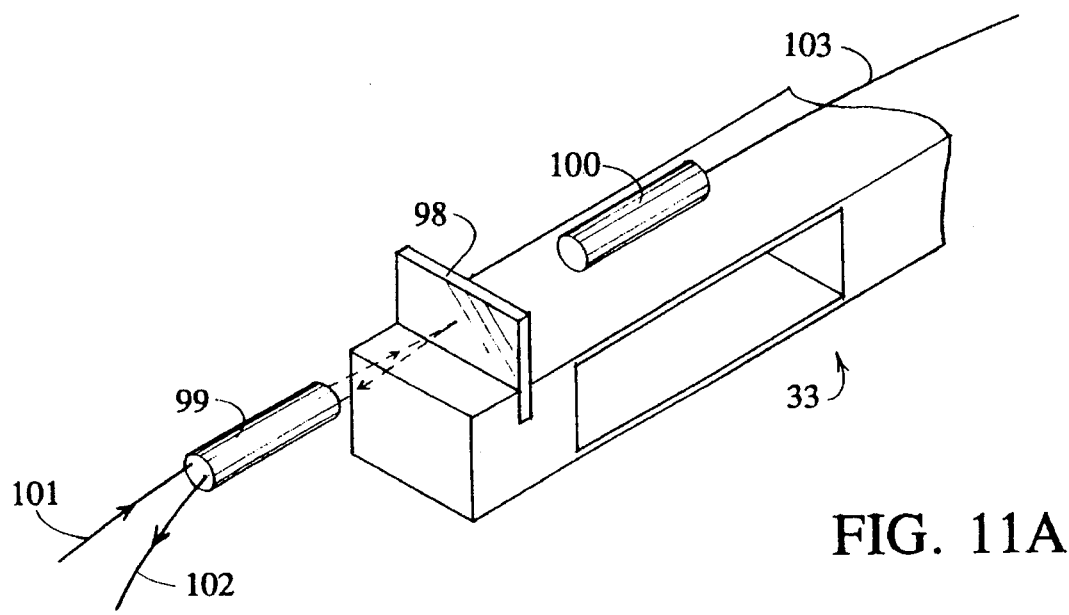
FIGS. 11A and 11B correspond to FIGS. 4A and 4B but illustrate a modification to the optical components applicable to any of the above embodiments.
Figure 11B:
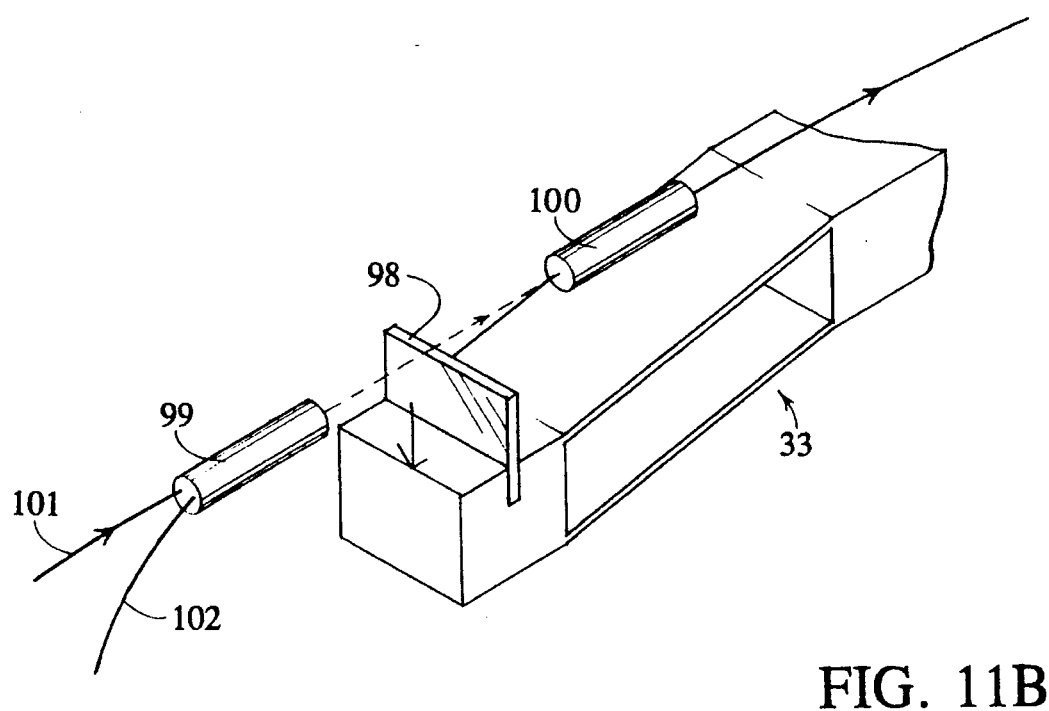

It will be appreciated that the invention embraces various alternatives and modifications. Thus, although the described embodiments are 1×2 switches, using a prism to alter the path of a light beam, the invention is applicable generally to opto-mechanical devices in which at least one optical element, which could be a mirror, prism, polarizer, wave division multiplexer, optical filter, and so on, is moved mechanically relative to input and output ports to effect the required function. For example, FIGS. 11A and 11B, which correspond to FIGS. 4A and 4B, illustrate operation of a 1×2 optical switch in which the prism is replaced by a mirror 98 and the output port means comprises a single GRIN rod lens 99 which is aligned with a single input rod lens 100. Opposed ends of the rod lenses 99 and 100 are spaced apart allowing the mirror 98 to be inserted between them. The mirror 98 is mounted upon a twin-flexure suspension which is only illustrated schematically, but is actually similar to that shown in FIG. 1. An input optical fiber 101 and one output optical fiber 102 are connected off-center to the first rod lens 99. A second output optical fiber 103 is attached to the second rod lens 100. In use, a light beam from input optical fiber 101 will be expanded and collimated by the rod lens 99. Because the input fiber 101 is off-center, the collimated light beam will not be parallel to the axis of the rod lens 99. When the mirror 98 is interposed between the rod lenses, as in FIG. 11A, the light beam will be reflected back into the rod lens and refocussed to couple to the adjacent output optical fiber 102. However, when the mirror 98 is displaced out of the optical path, a light beam from input rod lens 99 will pass uninterrupted to output GRIN rod lens 100 and be coupled into output optical fiber 103.

It should be appreciated that references in the foregoing description to specific orientations (e.g. upwards) apply only for convenience of description. The opto-electronic switches may have any orientation when in use.

An advantage of embodiments of the invention, in which the mechanical movement of the optical element relies on flexing of flexible metal sheets, is the elimination of sliding surfaces and possible effects of metal corrosion and rusting, permitting precision and dependability.

An advantage of the suspension unit disclosed herein, with the flexures integral with the anchorage and the mounting, is that it can be formed from a single block of material, for example aluminum.

Although embodiments of the invention have been described and illustrated in detail, it is to be clearly understood that the same is by way of illustration and example only and is not to be taken by way of the limitation, the spirit and scope of the present invention being limited only by the appended claims.

What is claimed is:

1. An opto-mechanical device comprising first port means and second port means interconnected by an optical path, an optical element, and actuator means for moving the optical element relative to the optical path so as to change coupling of light beams between the first port means and the second port means, the optical element being displaceably supported by a flexible suspension means comprising a pair of mutually-spaced twin elongate flexures, each of the flexures being attached at one end to an anchorage, the optical element being mounted to respective other ends of the flexures, the flexures being spaced apart in the direction of displacement of the optical element, the arrangement being such that the flexures flex together as the optical element is displaced and, during said displacement, the optical element maintains substantially the same angular orientation relative to the displacement direction.

2. An opto-mechanical device as claimed in claim 1, wherein the flexures are resilient and return to their original condition upon de-activation of the actuator means.

3. An opto-mechanical device as claimed in claim 1, wherein the optical element is supported by a mounting attached to the flexures, and the mounting, the anchorage, and the flexures form an integral unit, the flexures being attached at their respective one ends to respective spaced positions at the anchorage and at their respective other ends, to respective spaced positions at the mounting.

4. An opto-mechanical device as claimed in claim 1, wherein the optical element is supported by a mounting attached to the flexures, each of the mounting and the anchorage comprises a block having parallel faces, and the flexures are attached at their respective one ends to respective surfaces of the anchorage and, at their respective other ends, to respective faces of the mounting.

5. An opto-mechanical device as claimed in claim 1, wherein each flexure comprises flexible web portions adjacent each end and a medial portion that is substantially thicker than the web portions.

6. An opto-mechanical device as claimed in claim 1, wherein the optical element is supported by a mounting attached to the flexures, and the actuator mechanism comprises a solenoid having an operating coil and an armature, the armature acting against the mounting to displace the optical element, the displacement axis of the armature being substantially aligned with the middle of the mounting.

7. An opto-mechanical device as claimed in claim 1, wherein the optical element is supported by a mounting attached to the flexures and the device comprises a switch body having upstanding from one face thereof two spaced support members supporting the input and output port means and defining a space therebetween, one of the support members being narrower than the switch body, longitudinal axes of the flexures extending parallel to the optical path and alongside the narrower support member, the optical element projecting transversely to the longitudinal axis of the suspension unit into a space defined between the two support members, the actuator means comprising an electromagnet having two elongate armature members extending parallel to the longitudinal axes of flexures, the armature members having pole pieces extending perpendicularly from respective ends of the armature members to positions adjacent the mounting, and permanent magnets attached to respective opposite sides of the mounting, the permanent magnets being attracted towards, or repelled from, the pole pieces when the electromagnet is energized.

8. An opto-mechanical device as claimed in claim 7, wherein the electromagnet comprises operating coils wound directly upon the respective pole pieces.

9. An opto-mechanical device as claimed in claim 7, further comprising non-magnetic shims attached to respective end faces of the pole pieces.

10. An opto-mechanical device as claimed in claim 1, wherein the optical element is supported by a mounting attached to the flexures and the actuator mechanism comprises a solenoid having an operating coil and a displaceable armature, the armature acting against the mounting to displace the optical element.

11. An opto-mechanical device as claimed in claim 1, wherein the optical element is supported by a mounting attached to the flexures and the actuator means comprises one or more electromagnets cooperating with a corresponding one or more magnetic parts of, or attached to, the mounting.

12. An opto-mechanical device as claimed in claim 11, the electromagnet comprises operating coils wound directly upon the respective pole pieces, a core of the electromagnet being positioned medially of the body of the switch and having transversely-extending extension pieces supporting the pole pieces.

13. An opto-mechanical device comprising input port means and output ports means, an optical element between the input port means and the output port means, the optical element carried by a mounting attached to an anchorage by a pair of mutually-spaced twin flexures, each of the flexures being attached at its one end to the mounting and at its other end to the anchorage, the flexures being identical in length and flexibility, and actuation means for displacing the mounting and optical element so as to change an optical path for light passing between the input port means and the output port means, the flexures, mounting and anchorage being integral, longitudinal axes of the flexures extending generally parallel to respective optical axes of the input and output ports, the actuator mechanism comprising an electromagnet having armature pole pieces arranged with their respective pole axes parallel to the direction of displacement of the optical element, each of the pole pieces having an operating coil wound thereupon and a non-magnetic shim attached to its end face.

14. An opto-mechanical device as claimed in claim 13, wherein each flexure comprises a medial portion that is substantially thicker than, and extends between, flexible web portions adjacent opposite ends of the flexure.

15. An opto-mechanical device comprising first optical port means and second optical port means interconnected by an optical path, a mounting for an optical element, and actuator means for moving the mounting and an optical element mounted thereupon relative to the optical path so as to change coupling of light beams between the first port means and the second port means, the mounting being displaceably supported by a flexible suspension means comprising a pair of elongate flexures, each of the flexures being attached at one end to an anchorage and at its other end to the mounting, the flexures being spaced apart in the direction of displacement of the mounting, the arrangement being such that the mounting maintains substantially the same angular orientation relative to the displacement direction during said displacment.

* * * * *